June 17, 1958 H. MAROHN ET AL 2,839,178
CONVEYORS
Filed July 26, 1956 3 Sheets-Sheet 1
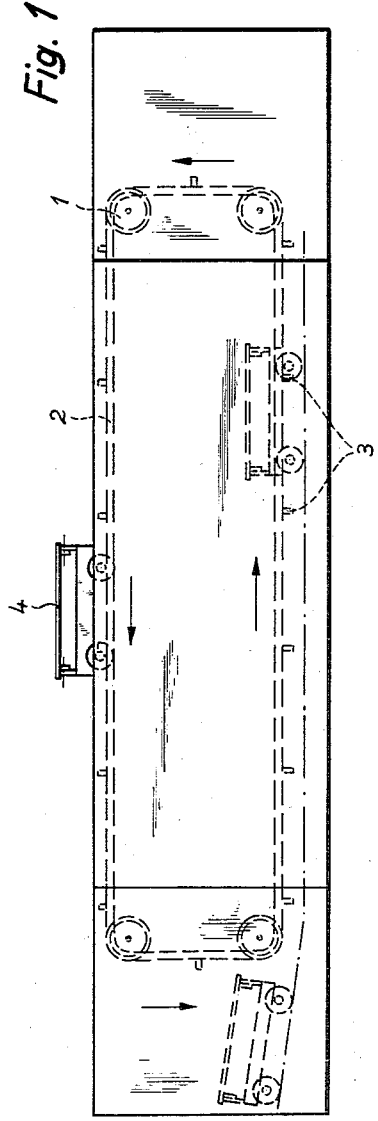
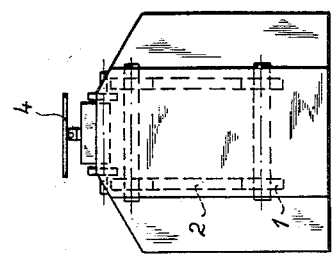

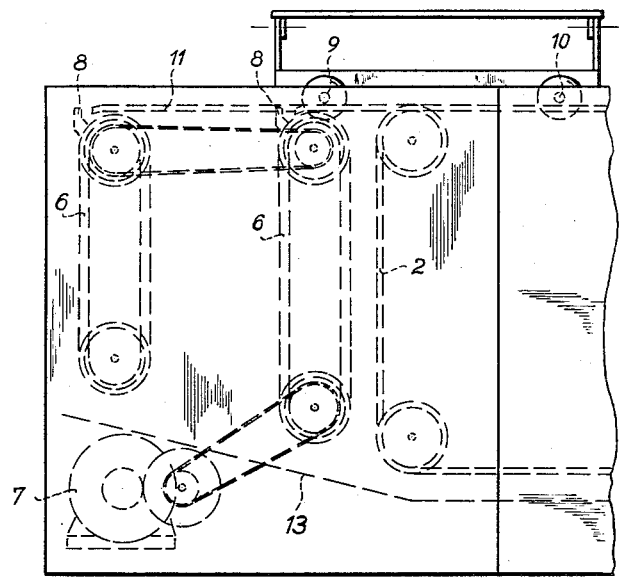
Fig. 3
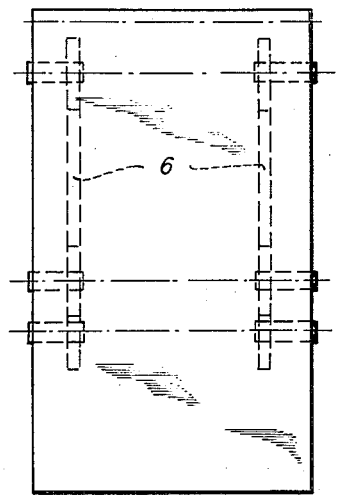
Fig. 4
Fig. 5
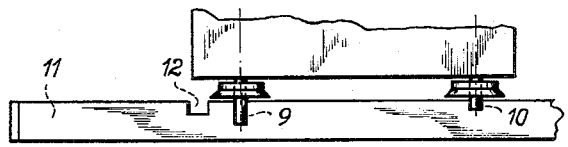

United States Patent Office 2,839,178
Patented June 17, 1958

2,839,178
CONVEYORS

Herbert Marohn, Heinrich Eckhard, and Theobald Immesberger, Kaiserslautern, Pfalz, Germany, assignors to G. M. Pfaff A.-G., Kaiserslautern, Pfalz, Germany, a German joint-stock company Application July 26, 1956, Serial No. 600,311

Claims priority, application Germany July 30, 1955

4 Claims. (Cl. 198—85)

This invention relates to conveyors of endless type for use in the transport of work-pieces or the like to various work stations in a factory, on an assembly line and for similar serial operation. Usually the installation is under the supervision of a work-distributor, say at one end of the conveyor who determines selectively at what stations the work-pieces shall be delivered by the conveyor.

It is one object of the invention to provide a device by means of which conveyor units are conveyed in two directions in superimposed planes while maintaining their horizontal position, and in such a manner that the containers follow each other immediately, that is to say, with a very small interval, practically even without an interval, thus giving a free choice of overall dimensions.

It is another object of the invention to provide that, at each of the reversing points of the conveyor device, a reversing mechanism is provided forming a lowering mechanism at one end of the conveyor and a lifting mechanism at the other end for changing over the conveyor units between the forward and return runs of the conveyor device.

A further object of the invention is to provide a conveyor device having two pairs of chains in the lifting and lowering mechanisms which cause the conveyed items to assume an inclined position as they are transferred from one run of the conveyor to the other. For this purpose, the pairs of chains of each change-over mechanism may be of relatively different lengths and move at different speeds. In this connection, it is a special advantage to impart a higher rotating speed to the change over mechanisms than that of the main conveyor device.

Although containers and container carriers of any kind may be conveyed by means of the arrangement constructed according to the invention, it is advisable to fit the containers or carriers thereof with rollers. With such containers and carriers thereof respectively, tracks are provided in the region of one or both horizontal paths of the conveyor, according to another proposal of the invention, in which paths the rollers of the conveyor units are supported.

The invention also provides a special kind of transfer arrangement of the conveyor units from the conveyor to the lowering mechanism, this type of transference having many advantages, and similarly from the lifting mechanism to the conveyor. These special means consist of slide tracks co-operating with the suitably constructed ends of the roller axles.

Further features of the invention and details of the advantages obtained thereby will be apparent from the following description of one embodiment shown diagrammatically in the accompanying drawings:

Fig. 1 is a side elevation of the main conveyor having drag chains as the conveying means, and in which the direction of movement is indicated by arrows;

Fig. 2 is an end elevation of the same;

Fig. 3 is a side view of the change over mechanism for the left-hand end of the conveyor of Fig. 1;

Fig. 4 is an end elevation of the means shown in Fig. 3;

Fig. 5 is a partial plan of the said change over means;

Figure 6:
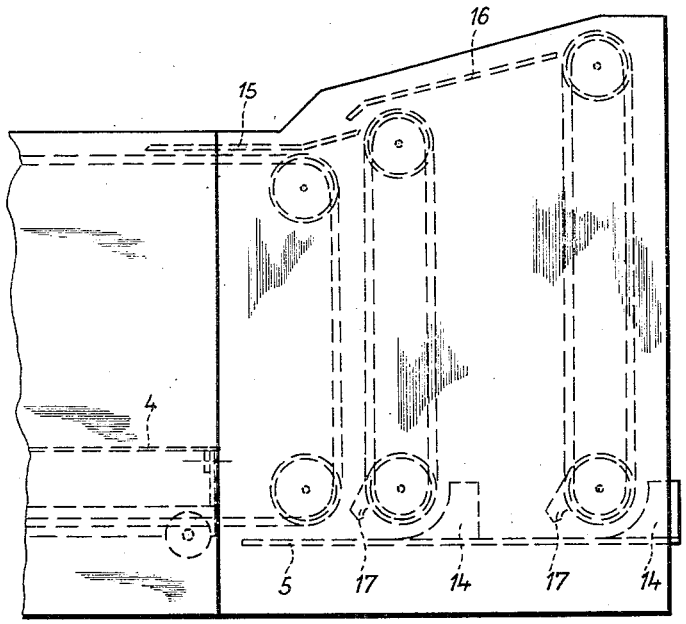
Fig. 6 is a side view of the change over mechanism for the right hand end of the conveyor of Fig. 1.
Figure 7:
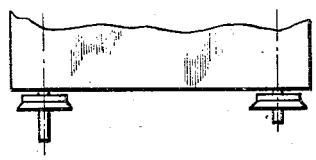
Fig. 7 is a ground plan of a part of one of the carriers to be transported by the conveyor.
Figure 8:
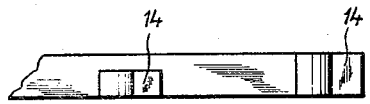
Fig. 8 is a partial plan, projected from Fig. 6, showing guide members for the axles of the carrier shown in Fig. 7.

Referring to Fig. 1, the main conveyor arrangement is enclosed in a housing or casing and consists substantially of two endless drag chains 2 running over chain wheels 1 and having grippers or pushers 3 at spaced intervals. The latter are of a size such that they come into contact with the axles of the carriers 4 when those carriers lie over the conveyor with their rollers running on suitable horizontal guides. In the embodiment, two drag chains 2 are provided at a distance from each other corresponding to the width of the conveyed carriers 4, and they are constructed as endless chain lengths. Two rails (not shown) in the upper part of said housing or casing act as a track for the rollers of the carriers when being advanced along the upper part of the conveyor, and similar tracks are provided in the lower part of the housing to convey the carriers whilst being pushed along by the return part of the conveyor. The said grippers or pushers 3 engage the axles at their ends, outside the width of the carriers.

A lifting mechanism arranged at one return point of the conveyor co-operates with the drag chains and a lowering mechanism arranged at the other return point of the conveyor likewise co-operates with those chains. The lowering mechanism shown in Figs. 3–5 consists of two pairs of endless chains 6 arranged vertically, these being driven through suitable counter shafts from a motor 7. In the embodiment as shown, the arrangement is such that the left-hand pair of chains 6 receives its drive at its upper end from the upper end of the right-hand pair of chains 6. Each of the two pairs of chains 6 carries a stop or buffer 8 for arresting the carriers 4 by engaging the axles 9 and 10 of the rollers of the carriers as is explained below.

As seen in Fig. 3, the two pairs of chain 6 forming the lowering mechanism are of different length and as may be seen from a consideration of the wheel diameter in the drawing, they rotate at different speeds. The right-hand pair of chains (Fig. 3) which is nearer the main conveyor 2, runs more quickly than the left-hand pair which is more distant from the main conveyor. The two pairs of chains 6 of the lowering mechanism are driven in such manner that the speed of the slower pair is always greater than the speed of the drag chains 2.

As shown in Fig. 5, the left-hand axle 9 of the carrier 4 is longer than the right-hand axle 10. The carriers 4 on the upper run of the drag chains 2 are transferred to the lowering mechanism by two slide tracks 11, one at each side of the structure and each of which has a recess 12 at a distance from the end less than the distance between the two axles. The said recesses in the opposed tracks are opposite each other. The passage formed by them is less than the projecting length of the longer axle 9 but greater than the projecting length of the shorter axle 10. Consequently the axle 9 passes over the recesses 12, and eventually moves off the ends of the tracks, whereas the shorter axle 10 falls through the recesses 12. The axles of the carrier are received by the said supporting members or buffers 8, the longer axle 9 being received by the members 8 of the shorter pair of chains, and the shorter axle 10 being received by the members 8 of the longer pair of chains of the lowering mechanism.

Owing to the difference in the speed of rotation of the pairs of chains 6, the carriers 4 adopt an inclined position as they are lowered. In this position they are delivered to an inclined plane 13 below the lowering mechanism and they then roll down this inclined plane by reason of their weight until they are automatically engaged by the grippers or pushers of the drag chains 2. They are then moved along the lower tracks mentioned above.

The advance of the carriers from the upper run of the chains 2 on to the said slide 11 is effected by the following carriers on the chains 2 pushing them along, until they are transferred to the chains 6.

Referring now to Fig. 6, there is arranged at the right-hand end of the main conveyor, a lifting mechanism which is constructed substantially in the same manner as the said lowering mechanism. The object of this lifting mechanism is to transfer the carriers from the lower run of the conveyor to the upper run. The carriers 4 approaching along the lower run of the chains 2 pass by their axles on to slide tracks 5 of which there is one on each side. In this case also, the advance of the carrier being transferred is effected by the following carriers pushing it along as they are moved by the conveyor chains.

Guide members 14 are provided on the tracks 5 for limiting the horizontal movement of the axles of the carrier and constraining them to move upwards with the pairs of chains of the lifting mechanism. The curvature of these guide members 14 corresponds to surface traced by outer points of the supporting member 17 on the lifting chains. These members 17 are constructed similarly to the already described supporting members 8 of the lowering mechanism.

The guide members 14 enclose the chains as they pass around the guide pulleys. They are arranged in pairs and the space between those of each pair is such that the shorter roller axle 10 of the carrier 4 will pass the first pair of guide members viewed in the direction of conveying as these have a greater width between them and eventually strike the second pair of guide members which have a smaller width between them.

At the same time as axle 10 meets the second pair of guide members, the axle 9 strikes the first pair of guide members. In this position the roller axles 9 and 10 are simultaneously seized by the corresponding supporting members 17 of the two pairs of chains belonging to the lifting mechanism.

In the case of the lifting mechanism also, as was the case with the lowering mechanism, the two pairs of chains rotate at different speeds, the right-hand pair (Fig. 6) moving at a greater speed so that the carriers are inclined as they are lifted. In this position they are deposited by the ends of their roller axles 9 and 10 on suitably inclined slide tracks 15 and 16 after the lifting members 17 have passed through their highest position. The longer axles 9 pass underneath the trackway 16. Under the influence of their own weight the carriers then run downwardly on the tracks 15 and 16 until the rollers are located on the said upper tracks in the region of the drag chains, and the movement is then continued by the grippers or pushers 3 of the drag chains 2 engaging the axles 9 and 10.

Both change over mechanisms are automatically controlled as by switch mechanism operated by the passing carriers, in such manner that after each transfer of a carrier the lifting and lowering chains are stopped in the position for receiving the next carrier to be transferred. This may be achieved, for instance, by using brake motors or controlled clutches, under the control of automatic switching devices, for driving the change over mechanisms.

The new apparatus makes it possible to divide the room in which it is erected into work stations grouped along it, with a further station, for the work distributor. At the same time it will be advisable to provide each successive work station along the conveyor with a compartment for apportioning conveyor units from the said carriers, namely a work compartment and a delivery compartment for the conveyor units. At the work distributor's station apportioning and delivery departments are to be provided for the said units, the number of which depends on the length of the installation.

The work distributor at the distributing station places a work box with work-pieces in its delivery compartment. Then, by pressing a key on his control desk the work distributor decides at which work station this box is unloaded from the conveyor. If the apportioning compartment at that station is already occupied the carrier with the box runs round on the conveyor again. The operator pushes the box from the apportioning compartment into the work compartment so that the apportioning compartment is free for new boxes. The box, with the finished work in it, eventually goes into the operator's delivery compartment. By pressing another key on a control desk, the next work station or work distributing station for this box is selected.

At the place occupied by the work distributor a registering arrangement fitted with light bulbs can be provided near the control desk to show automatically when an apportioning place at a work station is free to receive a work box.

What we claim is:

1. In a transport system, for use in connection with containers having two axles spaced apart from each other, the combination comprising two endless chains arranged parallel to each other, each chain having two superposed horizontal portions and two vertical portions, a lifting mechanism adjacent one of the vertical portions of said chains, and a lowering mechanism adjacent the opposite vertical portions of said chains, said chains comprising pushing members for impelling said containers, trackways for said containers arranged adjacent the horizontal portions of said chains and below said lowering mechanism and above said lifting mechanism, said lifting and lowering mechanisms and said trackways forming a closed path for said containers, said lifting and lowering mechanisms each being composed of two pairs of endless conveyors, each pair being operable to suspend the container from one of its axles, each pair of each conveyor moving within the endless path at a speed different from that of the other pair of the same conveyor whereby the container will be tilted from the horizontal during lifting and lowering.

2. In a transport system, as claimed in claim 1, the two axles of each container differing in lengths, and means formed on said trackways cooperating with said axles for guiding said containers to and from positions of registry for connection with said mechanisms for lowering and lifting.

3. In a transport system, as claimed in claim 1, one of the axles of each container being longer than the other axle, the trackway portion disposed above the lowering mechanism having a recess to receive the shorter axle and to reject the longer axle for positioning the container in a predetermined position of registry above the lowering mechanism prior to the lowering.

4. In a transport system, as claimed in claim 1, opposite arcuate guides adjacent the lowermost point of the conveyors of the lifting mechanism and having a curvature corresponding to the curvature of the path of said conveyors adjacent the guides, some of said opposite guides being spaced from each other for a distance larger than the others for passing said long axles of said containers and the other guides being spaced for a shorter distance forming abutments for said longer axles, whereby said containers will be positioned below said lifting mechanism in a predetermined position of registry prior to being lifted thereby.

References Cited in the file of this patent
UNITED STATES PATENTS 1,837,605   Baker _____ Dec. 22, 1931

FOREIGN PATENTS 471,083   Italy _____ May 5, 1952